No. 682,179. Patented Sept. 10, 1901.
I. C. DRAKE.
HASP LOCK.
(Application filed Dec. 6, 1900.)
(No Model.)
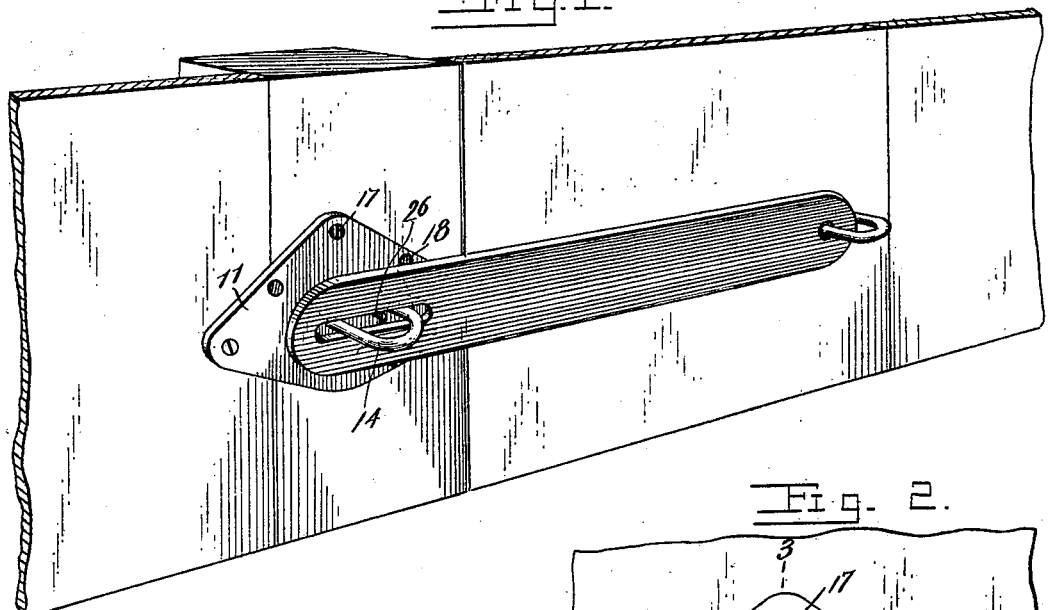
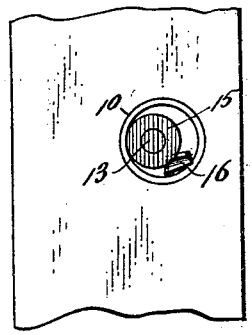
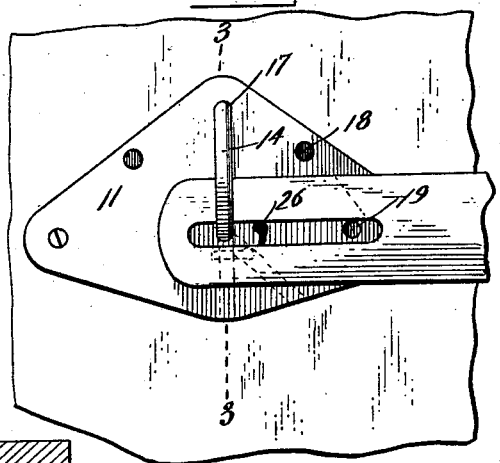
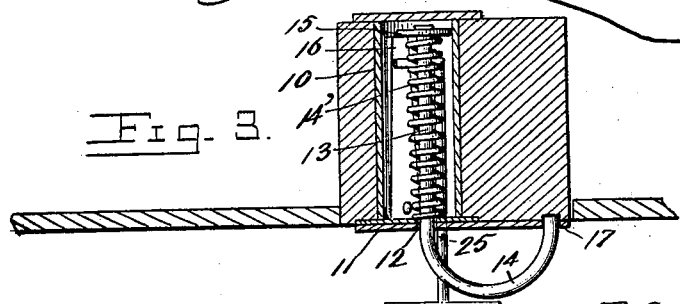
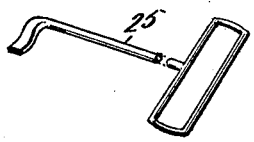
Witnesses
F. E. Alden
Geo. H. Chandlee
I. C. Drake, Inventor,
by C. A. Snow & Co.
Attorneys

UNITED STATES PATENT OFFICE.

IRA C. DRAKE, OF ORTING, WASHINGTON.

HASP-LOCK.

SPECIFICATION forming part of Letters Patent No. 682,179, dated September 10, 1901.

Application filed December 6, 1900. Serial No. 38,935. (No model.)

*To all whom it may concern:*

Be it known that I, IRA C. DRAKE, a citizen of the United States, residing at Orting, in the county of Pierce and State of Washington, have invented a new and useful Hasp-Lock and Staple, of which the following is a specification.

This invention relates to means for fastening hasps whether permanently or temporarily; and it has for its object to provide a simple and cheap construction for this purpose which will be efficient in its operation.

In the drawings forming a portion of this specification, and in which like numerals of reference indicate similar parts in the several views, Figure 1 is a perspective view showing the invention applied to a door-jamb and having a hasp engaged therewith, the bail of the lock being in position to permit of application and removal of the hasp. Fig. 2 is an elevation showing the bail of the lock turned to its locking position. Fig. 3 is a section on line 3 3 of Fig. 2, the bail and other portions of the lock being shown in elevation. Fig. 4 is a rear elevation of the end of the stem of the locking-bail and showing the position of the spring-tumbler when in its engaged position. Fig. 5 is a detail perspective view showing the key used for releasing the tumbler from the stem of the bail.

Referring now to the drawings, the lock employed consists of a casing including a barrel 10, having a lock-plate 11 at its outer end and which plate extends laterally in all directions from the barrel and has a perforation 12 therein which leads into the barrel and forms a bearing. In the bearing 12 is rotatably disposed the stem 13 of a bail 14, this stem projecting into the barrel and terminating near the opposite end thereof, and on this stem and within the barrel is disposed a helical spring 14', one end of which rests against the lock-plate 11, while the opposite end bears against a disk 15, fixed to the inner end of the stem of the bail and which projects beyond the spring, as shown in Fig. 3 of the drawings. This helical spring acts to hold the bail normally in position to lie with its outer hooked end against the outer surface of the lock-plate 11. When the stem of the bail is drawn into the barrel to a maximum degree, it is held in this position by means of a tumbler in the form of a spring-plate 16, one end of which is fixed to the inner wall of the barrel, while the opposite free end, which projects in the direction of the rear of the casing, rests against the side of the disk 15, so that when the bail is pushed with its stem rearwardly and the disk is moved beyond the extremity of the spring-plate, said plate will snap under the edge of the disk and will prevent return movement of the bail. When the outer end of the bail rests against the surface of plate 11, the stem is drawn outwardly against the tendency of the helical spring to that extent, which insures resting of the spring-tumbler against the side edge of the disk or in its inactive position, and to permit of inward movement of the bail to an extent sufficient to permit of the tumbler snapping under the disk a perforation 17 is formed in the plate 11 in such position as to receive the outer end of the bail. For the reasons hereinafter set forth it is desirable at times to hold the bail against pivotal movement temporarily without locking it, and for this purpose other perforations 18 and 19 are formed in the plate 11 in proper positions to receive the extremity of the bail.

In applying this lock to the jamb of a door it is so arranged that when the bail is in its locked position it will lie in a plane transverse to the hasp that may be engaged therewith. When the hasp is to be applied, the bail is turned to the position shown in Fig. 1, which is at right angles to its locked position, and when the hasp is to be locked the bail is then turned with its free end upwardly until it reaches a vertical position, at which time it will be directly over the locking-perforation 17, and if released its helical spring will draw it into the perforation and at the same time will move the stem of the bail to a degree sufficient to permit of the tumbler snapping under the disk at the inner end of the stem of the bail, and thus to lock the bail against outward movement and consequent disengagement from perforation 17 to permit of rotation. If the hasp is to be held only temporarily in engagement with the bail, the bail is moved from its initial position above described, with its free end downwardly to rest against the surface of plate 11. The additional perforations in the plate 11 are to receive the end of the bail and hold it in proper position for engagement by the hasp when the hasp may have a different position relative to the lock. To disengage the tumbler from the disk at the end of the bail-stem, a key 25 is provided, this key being adapted to be inserted through a hole 26 in plate 11 and moved into position to engage its web under the spring-tumbler, when by rotating the key the tumbler will be moved from its engaged position, as will be readily understood.

It will be understood that in practice various modifications of the specific construction shown may be made and that any suitable materials and proportions may be used for the various parts without departing from the spirit of the invention.

What is claimed is—

1. A hasp-lock comprising a lock-plate having a bearing therein, a casing to which the lock-plate is secured and having its bearing opening into the casing, said plate having recesses therein of different depths, a bail adapted to receive a hasp and having a stem rotatably disposed in the bearing and projecting into the casing, said bail being adapted for engagement of its outer end with the recesses of the plate interchangeably, a spring disposed to hold the bail normally retracted with its outer end in a recess of the plate to hold the bail in different positions against rotation, and a locking device for holding the bail against outward movement, said locking device being adapted for engagement with the bail when the outer end thereof is in the recess of greatest depth and for disengagement therefrom when the bail is in a recess of lesser depth.

2. A hasp-lock comprising a casing having a lock-plate secured thereto and having a bearing therein opening into the casing, a bail adapted to receive a hasp and having a stem rotatably disposed in the bearing and provided with a stop-plate at its inner end within the casing, a helical spring disposed upon the stem and bearing against the stop-plate and lock-plate to hold the bail yieldably retracted, a spring-plate disposed in the casing and resting normally with its free end against the stop-plate, said spring-plate being adapted to snap under the stop-plate when the stem is moved inwardly to its limit, to hold it in its inward position, said lock-plate having a locking-recess formed therein to receive the free end of the bail and permit inward movement of the bail-stem to carry the stop-plate beyond the spring-plate.

3. A hasp-lock comprising a lock-plate having a bearing therein, a casing to which the lock-plate is secured and having its bearing opening into the casing, said plate having recesses therein of different depths, a bail adapted to receive a hasp and having a stem rotatably disposed in the bearing and projecting into the casing, said bail being adapted for engagement of its outer end with the recesses of the plate interchangeably, a spring disposed to hold the bail normally retracted with its outer end in a recess of the plate to hold the bail in different positions against rotation, and a locking device for holding the bail against outward movement, said locking device being adapted for engagement with the bail when the outer end thereof is in the recess of greatest depth and for disengagement therewith when the bail is in a recess of lesser depth, said locking device including a stop-plate at the inner end of the stem of the bail and a spring-plate disposed for engagement behind the stop-plate when the stem is at the inner limit of its movement.

In testimony that I claim the foregoing as my own I have hereto affixed my signature in the presence of two witnesses.

IRA C. DRAKE.

Witnesses:
WM. M. WYCKOFF,
M. J. ROWE.